United States Patent
Covi et al.

(10) Patent No.: US 12,175,583 B2
(45) Date of Patent: Dec. 24, 2024

(54) METHOD AND APPARATUS FOR OPERATING A DIGITAL ASSISTANT OF A VEHICLE

(71) Applicant: Bayerische Motoren Werke Aktiengesellschaft, Munich (DE)

(72) Inventors: Jessica Covi, Munich (DE); Maija Heckel, Munich (DE); Anja Popovic, Munich (DE); Stefanie Richtsfeld, Munich (DE); Christian Zwarg, Munich (DE); Matthias de Clerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 26 days.

(21) Appl. No.: 17/909,262

(22) PCT Filed: Jan. 19, 2021

(86) PCT No.: PCT/EP2021/050996
§ 371 (c)(1),
(2) Date: Sep. 2, 2022

(87) PCT Pub. No.: WO2021/190796
PCT Pub. Date: Sep. 30, 2021

(65) Prior Publication Data
US 2023/0085795 A1    Mar. 23, 2023

(30) Foreign Application Priority Data
Mar. 24, 2020   (DE) .................. 10 2020 107 997.4

(51) Int. Cl.
*G06T 13/80*    (2011.01)
*G06F 9/451*    (2018.01)

(52) U.S. Cl.
CPC .............. *G06T 13/80* (2013.01); *G06F 9/453* (2018.02); *G06T 2210/56* (2013.01)

(58) Field of Classification Search
None
See application file for complete search history.

(56) References Cited

U.S. PATENT DOCUMENTS

2014/0365126 A1* 12/2014 Vulcano ............. G01C 21/3617
                                                                         701/538
2015/0373183 A1* 12/2015 Woolsey ........... H04M 1/72448
                                                                         455/418

(Continued)

FOREIGN PATENT DOCUMENTS

DE    102010052291 A1    5/2012
DE    102013000132 A1    7/2014

(Continued)

OTHER PUBLICATIONS

Lock, "Google dots", https://www.youtube.com/watch?v=IYyRpZgIZP4, Sep. 3, 2015.*

(Continued)

*Primary Examiner* — Jeffrey J Chow
(74) *Attorney, Agent, or Firm* — Maginot, Moore & Beck LLP

(57) ABSTRACT

A method for operating a digital assistant of a vehicle includes receiving a status of the digital assistant, and determining a display device for displaying the status of the digital assistant. The method further includes determining at least one display parameter of the display device. The method also includes generating an animated visual control object depending on the status of the digital assistant, the display device, and the at least one display parameter. The animated visual control object is deployed on the display device. A corresponding system performs the method.

19 Claims, 1 Drawing Sheet

(56) References Cited

U.S. PATENT DOCUMENTS

| | | | | |
|---|---|---|---|---|
| 2016/0259719 A1* | 9/2016 | Gouvernel | ............... | G06F 9/455 |
| 2017/0230539 A1* | 8/2017 | Shimizu | .................... | G06T 3/40 |
| 2020/0178073 A1* | 6/2020 | Goluguri | ............... | H04W 12/02 |
| 2020/0227034 A1* | 7/2020 | Summa | ................... | G10L 15/22 |

FOREIGN PATENT DOCUMENTS

| | | |
|---|---|---|
| DE | 112012005729 T5 | 10/2014 |
| EP | 2960096 A2 | 12/2015 |
| EP | 3173279 A1 | 5/2017 |

OTHER PUBLICATIONS

International Search Report corresponding to International Patent Application No. PCT/EP2021/050996, dated Mar. 24, 2021 (3 pages).

* cited by examiner

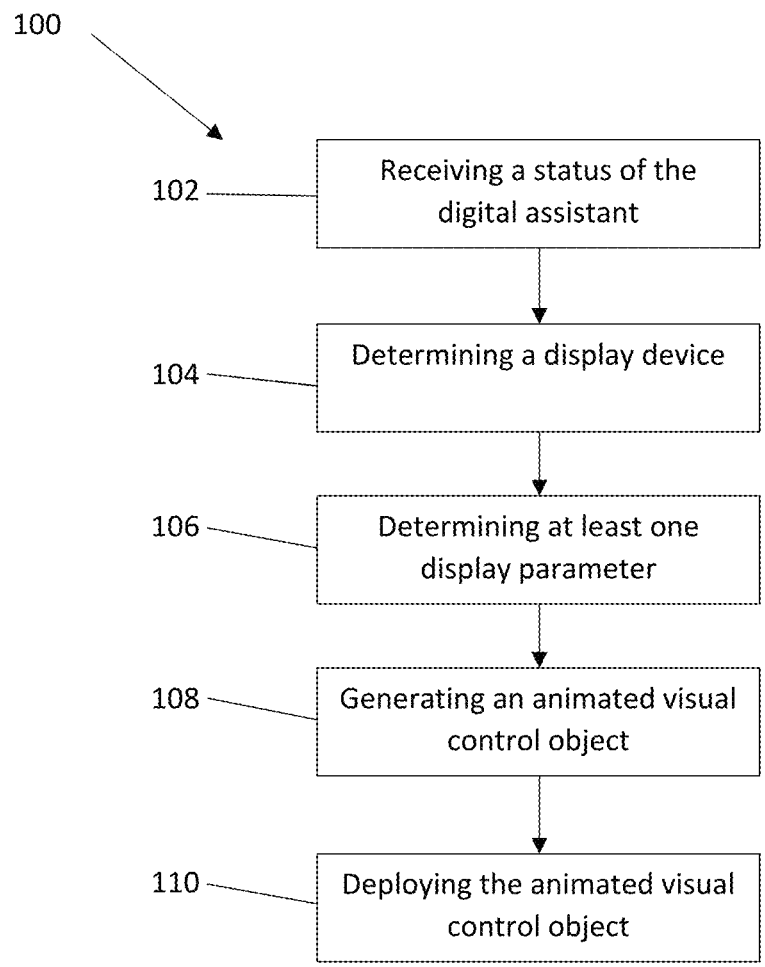

METHOD AND APPARATUS FOR OPERATING A DIGITAL ASSISTANT OF A VEHICLE

The present application is the U.S. national phase of PCT Application PCT/EP2021/050996 filed on Jan. 19, 2021, which claims priority of German patent application No. 102020107997.4 filed on Mar. 24, 2020, which is incorporated herein by reference in its entirety.

TECHNICAL FIELD

The disclosure relates to a method for operating a digital assistant of a vehicle. The disclosure further relates to a computer-readable medium for operating a digital assistant of a vehicle, a system for operating a digital assistant of a vehicle, and a vehicle comprising the system for operating a digital assistant of a vehicle.

BACKGROUND

Digital assistants that can communicate with a user of the vehicle using a voice interface are known. The digital assistant can be activated via an icon or a speech-based control input. In addition, the display of graphical information depending on the speech output of the digital assistant is known from the prior art.

It is an object to operate the digital assistant of the vehicle more efficiently. In particular, one object is to provide a status of the digital assistant to a user of the vehicle and in particular to a user of the vehicle's digital assistant, more efficiently, so that a human-machine interface between the user and the vehicle's digital assistant is simpler to operate.

SUMMARY

The above-described object, as well as others, are achieved by the features of the advantageous embodiments and developments disclosed herein.

A first aspect of the disclosure is characterized by a method for operating a digital assistant of a vehicle. The method can be a computer-implemented method and/or a control-unit-implemented method. The digital assistant can be an intelligent personal assistant, abbreviated to IPA, of the vehicle. The vehicle can be a partially, highly, or fully automatically driven vehicle. In particular, the vehicle can be a partially, highly, or fully automatically driven motor vehicle. The method comprises receiving a status of the digital assistant. The method also comprises determining a display device for displaying the status of the digital assistant and determining at least one display parameter of the display device. Depending on the status of the digital assistant, the display device and the at least one display parameter, the method creates an animated, visual control object. The method deploys the animated visual control object on the display device.

Advantageously, the method can dynamically generate an animated visual control object which is adapted to the display device on which it is deployed. The vehicle's digital assistant can be operated in such a way that a user of the vehicle's digital assistant is provided with an animated, visual control object that is representative of the status of the digital assistant and is dynamically adapted for the display unit.

According to an advantageous design, the status of the digital assistant can be representative of a state of an interaction between a user and the digital assistant, of a state of a dialog between the user and the digital assistant, and/or of a data processing state of the digital assistant. This allows the animated visual control object to be flexibly adapted to different states of the digital assistant and to efficiently provide these states to the user of the vehicle.

According to a further advantageous design, the display device can be a display of a mobile terminal that is linked to the vehicle; and/or the display device can be a display of the vehicle which is permanently connected to the vehicle. This allows the status of the digital assistant to be deployed efficiently on different display devices.

According to a further, advantageous design, the at least one display parameter can comprise a size of a preferably virtual display area of the display device that is available for deploying the animated visual control object, and/or the at least one display parameter can comprise a maximum resolution of the display device with which the animated visual control object from the display device is deployed. This allows the animated visual control object to be efficiently adapted to a display device.

According to another advantageous embodiment, the animated visual control object can comprise a plurality of animated particle objects, and/or each animated particle object from the plurality of animated particle objects can have a graphical shape and a motion pattern. This allows the animated visual control object to be efficiently adapted to a state of the digital assistant.

According to another advantageous embodiment, generating an animated visual control object depending on the status of the digital assistant, the display device and the at least one display parameter can comprise generating a plurality of animated particle objects depending on the at least one display parameter of the display device, wherein a shape, a size, a depth-of-field parameter, and an initial position in a specified grid is determined for each animated particle object depending on the at least one display parameter of the display device and on the display device, and wherein the plurality of animated particle objects is generated with a particle density which is determined depending on the at least one display parameter of the display device and on the display device. This allows the animated visual control object to be efficiently adapted to the display device.

According to another advantageous embodiment, generating an animated visual control object depending on the status of the digital assistant, the display device and the at least one display parameter can further comprise determining a motion pattern for each animated particle object from the plurality of animated particle objects depending on the status of the digital assistant, wherein the motion pattern preferably defines a dynamics, a motion, and/or a depth of field depending on the status of the digital assistant. This allows the animated visual control object to be efficiently adapted to the status of the digital assistant.

According to another advantageous design, generating an animated visual control object depending on the status of the digital assistant, the display device and the at least one display parameter can further comprise determining a graphical pattern of the control object for the plurality of animated particle objects depending on the status of the digital assistant, wherein graphical patterns of the animated visual control object determine a target position for the motion of each animated particle object from the plurality of animated particle objects to which each animated particle object from the plurality of animated particle objects moves, by means of the respective motion pattern, and wherein the graphical pattern of the animated visual control object can preferably be representative of a function of the animated visual control object and/or representative of information about the animated visual control object to the user of the digital assistant. This allows the animated visual control object to be efficiently adapted to the status of the digital assistant.

According to a further, advantageous embodiment, the graphical shape and the motion pattern of each animated particle object can be determined depending on one or more vehicle-specific parameters. This allows the motion pattern of the animated visual control object to be efficiently adapted to a vehicle-specific context.

Another aspect of the disclosure is characterized by a computer-readable medium for operating a digital assistant of a vehicle, wherein the computer-readable medium comprises instructions that, when executed on a computer or a control unit, carry out the method described above.

A further aspect of the disclosure is characterized by a system for operating a digital assistant of a vehicle, wherein the system is designed to carry out the method described above.

Another aspect of the disclosure is characterized by a vehicle comprising the system described above for operating a digital assistant of a vehicle.

Additional features arise from the claims, the figures and the description of the figures. All the features and feature combinations cited in the description above, and the features and feature combinations cited in the description of the figures below and/or shown in the figures alone are applicable not only in the respective combination indicated, but also in other combinations or else in isolation.

In the following, a preferred exemplary embodiment is described by reference to the attached drawings. This will reveal further details, preferred embodiments and extensions.

BRIEF DESCRIPTION OF THE DRAWINGS

FIG. 1 shows an exemplary method for operating a digital assistant of a vehicle.

DETAILED DESCRIPTION

In detail, FIG. 1 shows an exemplary method 100 for operating a digital assistant on a vehicle. The method 100 can receive a status of the digital assistant 102. The status of the digital assistant can be representative of a state of an interaction between a user and the digital assistant, of a state of a dialog between the user and the digital assistant, and/or of a data processing state of the digital assistant. In addition, the status of the digital assistant can be associated with an emotion and/or a behavior.

The method 100 can determine one or more display devices to display the status of the digital assistant 104. Preferably, each display device is a display device of the vehicle or a mobile terminal that is communicatively connected to the vehicle. In addition, the method 100 can determine at least one display parameter, preferably a plurality of display parameters, of the respective display device 106. For example, a display parameter can be a size or resolution of a display area of the display device.

The method can further generate an animated visual control object depending on the status of the digital assistant, the display device and the at least one display parameter 108. The animated visual control object can be representative of the status of the digital assistant and inform the user of the digital assistant about the status of the digital assistant in a context-dependent manner with different emotions and/or behaviors. For example, the animated visual control can inform the user that the digital assistant is listening, thinking, speaking, confirming, communicating an emotion, and/or prompting a control action.

In detail, the animated visual control object can comprise a plurality of animated particle objects. Each animated particle object can have a graphical shape and a motion pattern. The graphical shape can be determined by the method 100 depending on vehicle-specific parameters. For example, the graphical shape can be determined depending on a vehicle type, a vehicle configuration and/or a vehicle-specific function. The motion pattern can be determined for each animated particle object depending on the status of the digital assistant. The motion pattern can define a dynamics, a movement, and/or a depth of field depending on the status of the digital assistant.

A number of particle objects in the plurality of the animated particle objects can be determined depending on one or more display parameters of the display device. For example, if a display parameter indicates that a display area exists for a small number of particle objects, e.g. less than 10 particle objects, the method can generate a corresponding number of animated particle objects. For example, in generating the plurality of animated particle objects, for each animated particle object a shape, a size, a depth-of-field parameter, and an initial position in a specified grid can be determined depending on one or more display parameters of the display device, and in particular on a type of the display device. The method can also define the particle density at which the animated particle objects are generated, wherein the particle density is determined depending on one or more display parameters of the display device and in particular on a type of the display device.

Furthermore, a graphical pattern of the control object can be determined for the plurality of animated particle objects depending on the status of the digital assistant. The graphical pattern of the animated visual control object can define a target position for the movement of each animated particle object from the plurality of animated particle objects to which each animated particle object from the plurality of animated particle objects moves, by means of its motion pattern. In addition, the graphical pattern of the animated visual control object can preferably be representative of a function of the animated visual control object and/or representative of information about the animated visual control object to the user of the digital assistant.

The method 100 can finally deploy the animated visual control object on the display device. By deploying the animated visual control object on the display device, the previously generated animated visual control object can be implemented. Advantageously, the animated visual control object does not need to be pre-defined for each display device, but can be dynamically adapted to display devices so that the animated visual control object can be deployed on different display devices. By using a plurality of particle objects to generate the animated visual control object, the visual control object can be flexibly adapted to vehicles and their different configurations. If the user changes the vehicle, there is no need to re-learn how to interact with the digital assistant, as the animated visual control object can be adapted to the appropriate vehicle environment and the operation of the digital assistant is simplified by the animated visual control object. Information about the status of the digital assistant can thus be provided to the user of the digital assistant more efficiently, in particular more easily. The digital assistant can be operated more efficiently in the vehicle because the user can more easily acquire information about the status of the digital assistant using the animated visual control object.

LIST OF REFERENCE SIGNS 100 method
102 Receiving a status of the digital assistant
104 Determining a display device
106 Determining at least one display parameter
108 Generating an animated visual control object
110 Deploying the animated visual control object

The invention claimed is:

1. A method for operating a digital assistant of a vehicle, the method comprising:
receiving a status of the digital assistant;
determining a display device from a plurality of display devices for displaying the status of the digital assistant, wherein the plurality of display devices include at least a mobile terminal that is linked to the vehicle and a display of the vehicle which is permanently connected to the vehicle;
determining at least one display parameter of the determined display device;
generating an animated visual control object depending on the status of the digital assistant, the determined display device, and the at least one display parameter, wherein generating the animated visual control object comprises generating a plurality of animated particle objects depending on the at least one display parameter of the determined display device, wherein the plurality of animated particle objects is generated with a particle density determined depending on the at least one display parameter and on the determined display device; and
deploying the animated visual control object on the determined display device.

2. The method as claimed in claim 1,
wherein the status of the digital assistant is representative of a state of an interaction between a user and the digital assistant, of a state of a dialog between the user and the digital assistant, and/or of a data processing state of the digital assistant.

3. The method as claimed in claim 1,
wherein the at least one display parameter is a size of a virtual display area of the display device that is available for deploying the animated visual control object; and
wherein the at least one display parameter comprises a maximum resolution of the display device with which the animated visual control object from the display device is deployed.

4. The method as claimed claim 1,
wherein the animated visual control object comprises a plurality of animated particle objects.

5. The method as claimed in claim 4,
wherein a graphical shape and a motion pattern of each of the plurality of animated particle objects are determined depending on one or more vehicle-specific parameters.

6. The method as claimed in claim 4,
wherein generating the animated visual control object depending on the status of the digital assistant, the display device and the at least one display parameter further comprises:
determining a motion pattern for each animated particle object of the plurality of animated particle objects depending on the status of the digital assistant, wherein the motion pattern defines a dynamic, a motion, and/or a depth of field depending on the status of the digital assistant.

7. The method as claimed in claim 6, wherein generating the animated visual control object depending on the status of the digital assistant, the display device and the at least one display parameter further comprises:
determining a graphical pattern of the animated visual control object for the plurality of animated particle objects depending on the status of the digital assistant, wherein at least the graphical pattern of the animated visual control object determines a target position for the motion of each animated particle object from the plurality of animated particle objects to which each animated particle object from the plurality of animated particle objects moves, by means of the respective motion pattern, and
wherein the graphical pattern of the animated visual control object is representative of a function of the animated visual control object and/or representative of information about the animated visual control object to the user of the digital assistant.

8. The method as claimed in claim 4,
wherein each of the plurality of animated particle objects has a graphical shape and a motion pattern.

9. The method as claimed in claim 8, wherein generating the animated visual control object depending on the status of the digital assistant, the display device and the at least one display parameter further comprises:
determining the motion pattern for each animated particle object of the plurality of animated particle objects depending on the status of the digital assistant, wherein the motion pattern defines a dynamic, a motion, and/or a depth of field depending on the status of the digital assistant.

10. The method as claimed in claim 9, wherein generating the animated visual control object depending on the status of the digital assistant, the display device and the at least one display parameter further comprises:
determining a graphical pattern of the animated visual control object for the plurality of animated particle objects depending on the status of the digital assistant, wherein at least the graphical pattern of the animated visual control object determines a target position for the motion of each animated particle object from the plurality of animated particle objects to which each animated particle object from the plurality of animated particle objects moves, by means of the respective motion pattern, and
wherein the graphical pattern of the animated visual control object is representative of a function of the animated visual control object and/or representative of information about the animated visual control object to the user of the digital assistant.

11. The method as claimed in claim 8, wherein generating the animated visual control object depending on the status of the digital assistant, the display device and the at least one display parameter further comprises:
determining a graphical pattern of the animated visual control object for the plurality of animated particle objects depending on the status of the digital assistant, wherein at least the graphical pattern of the animated visual control object determines a target position for the motion of each animated particle object from the plurality of animated particle objects to which each animated particle object from the plurality of animated particle objects moves, by means of the respective motion pattern, and wherein the graphical pattern of the animated visual control object is representative of a function of the animated visual control object and/or representative of information about the animated visual control object to the user of the digital assistant.

12. The method as claimed in claim 1, wherein a shape, a size, depth-of-field parameter, and an initial position in a specified grid is determined for each animated particle object, depending on the at least one display parameter of the display device and on the display device.

13. The method as claimed in claim 12, wherein a graphical shape and the motion pattern of each animated particle object are determined depending on one or more vehicle-specific parameters.

14. The method as claimed in claim 1, wherein generating the animated visual control object depending on the status of the digital assistant, the display device and the at least one display parameter further comprises:

determining a motion pattern for each animated particle object from a plurality of animated particle objects depending on the status of the digital assistant, wherein the motion pattern defines a dynamic, a motion, and/or a depth of field depending on the status of the digital assistant.

15. The method as claimed in claim 14, wherein generating the animated visual control object depending on the status of the digital assistant, the display device and the at least one display parameter further comprises:

determining a graphical pattern of the animated visual control object for the plurality of animated particle objects depending on the status of the digital assistant, wherein at least the graphical pattern of the animated visual control object determines a target position for the motion of each animated particle object from the plurality of animated particle objects to which each animated particle object from the plurality of animated particle objects moves, by means of the respective motion pattern, and wherein the graphical pattern of the animated visual control object is representative of a function of the animated visual control object and/or representative of information about the animated visual control object to the user of the digital assistant.

16. A non-transitory computer-readable medium for operating a digital assistant of a vehicle, wherein the computer-readable medium comprises instructions that, when executed on a computer or a control unit, cause the computer or control unit to:

receive a status of the digital assistant;

determine a display device for displaying the status of the digital assistant;

determine at least one display parameter of the determined display device;

generate an animated visual control object depending on the status of the digital assistant, the display device, and the at least one display parameter, wherein generating the animated visual control object comprises generating a plurality of animated particle objects depending on the at least one display parameter of the determined display device, wherein the plurality of animated particle objects is generated with a particle density determined depending on the at least one display parameter and on the determined display device; and deploy the animated visual control object on the determined display device.

17. The non-transitory computer-readable medium of claim 16, wherein the at least one display parameter is a size of a virtual display area of the display device that is available for deploying the animated visual control object;

wherein the at least one display parameter comprises a maximum resolution of the display device with which the animated visual control object from the display device is deployed; and/or wherein a graphical shape and a motion pattern of the animated visual control object are determined depending on one or more vehicle-specific parameters.

18. A vehicle comprising:

a vehicle display; and a digital assistant in communication with the vehicle display;

wherein the digital assistant is configured to:

determine a display device for displaying the status of the digital assistant, the display device determined by selecting one of the vehicle display and a mobile terminal;

determine at least one display parameter of the determined display device;

generate an animated visual control object depending on a status of the digital assistant, the display device, and the at least one display parameter, wherein generating the animated visual control object comprises generating a plurality of animated particle objects depending on the at least one display parameter of the determined display device, wherein the plurality of animated particle objects is generated with a particle density determined depending on the at least one display parameter and on the determined display device; and deploy the animated visual control object on the display device.

19. The vehicle of claim 18:

wherein the at least one display parameter is a size of a virtual display area of the display device that is available for deploying the animated visual control object;

wherein the at least one display parameter comprises a maximum resolution of the display device with which the animated visual control object from the display device is deployed; and/or wherein a graphical shape and a motion pattern of the animated visual control object are determined depending on one or more vehicle-specific parameters.

* * * * *